Aug. 1, 1933.   A. O. JAEGER   1,920,796
PURIFICATION OF ORGANIC COMPOUNDS
Original Filed Nov. 21, 1927   14 Sheets-Sheet 1
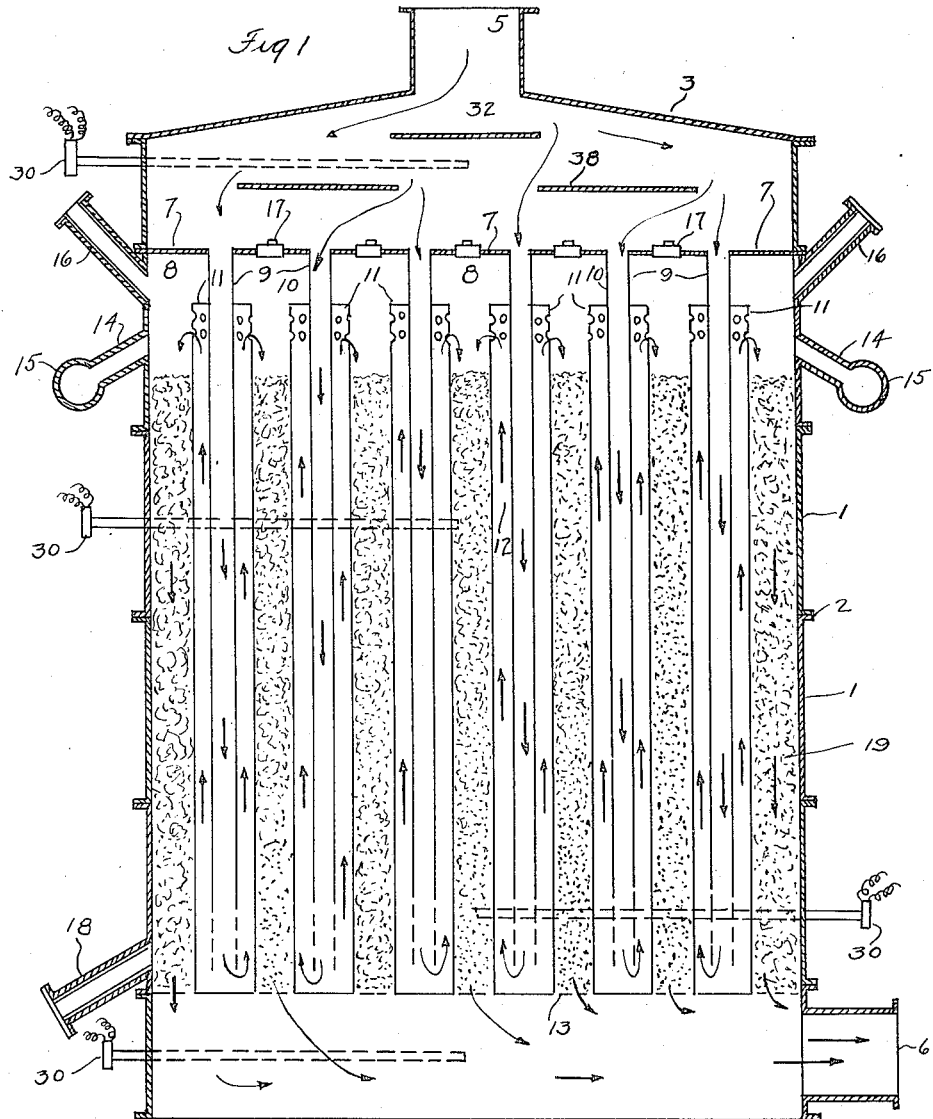
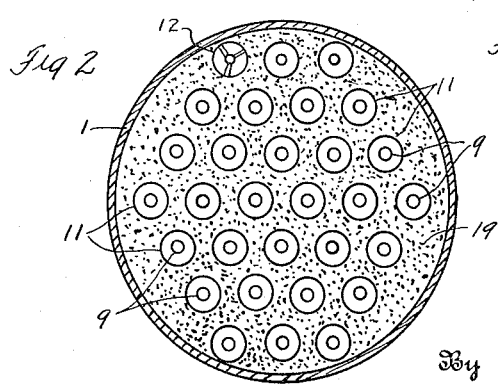
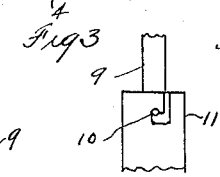
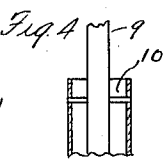
Inventor
Alphons O. Jaeger
By Robert Ames Norton
Attorney

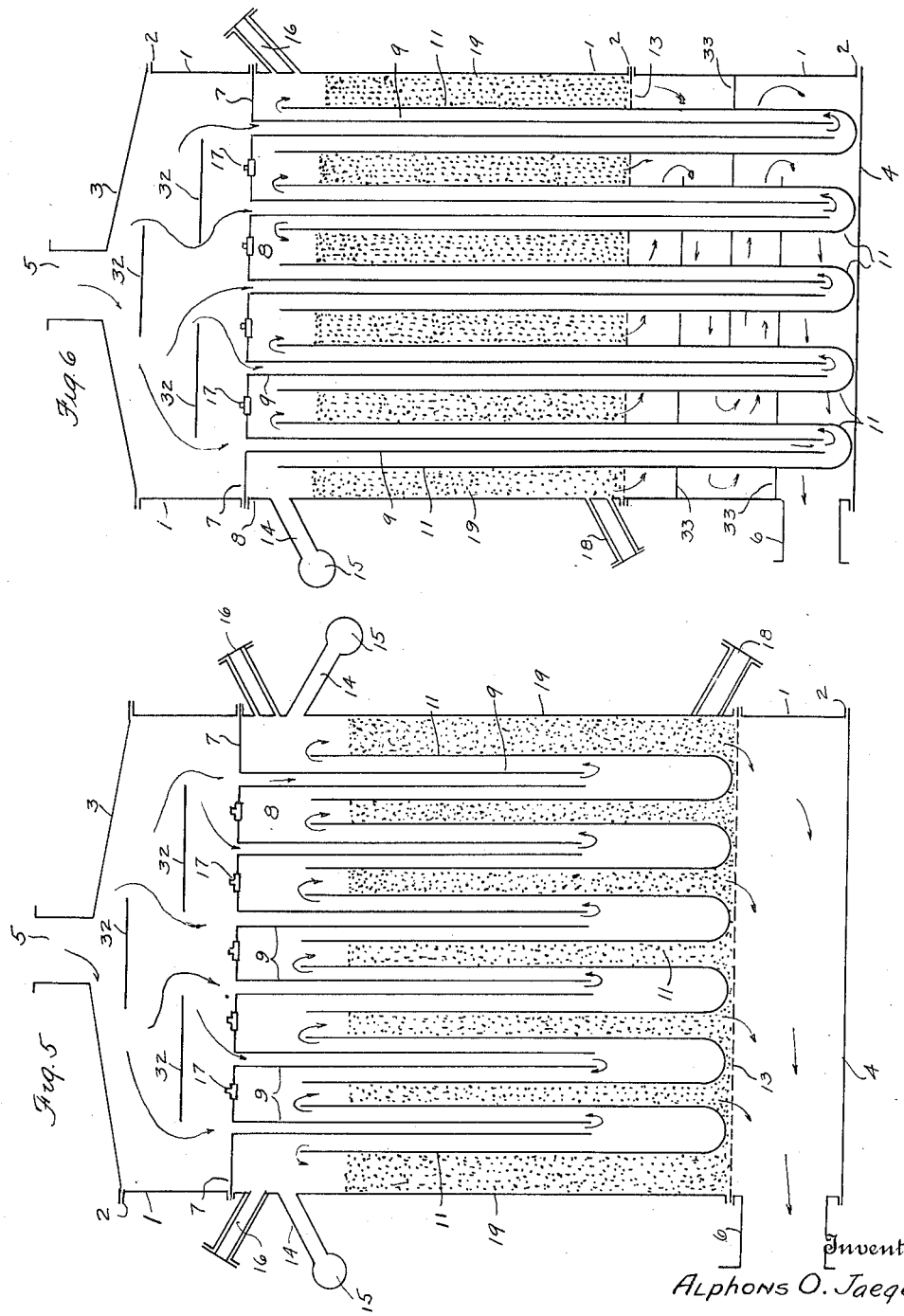

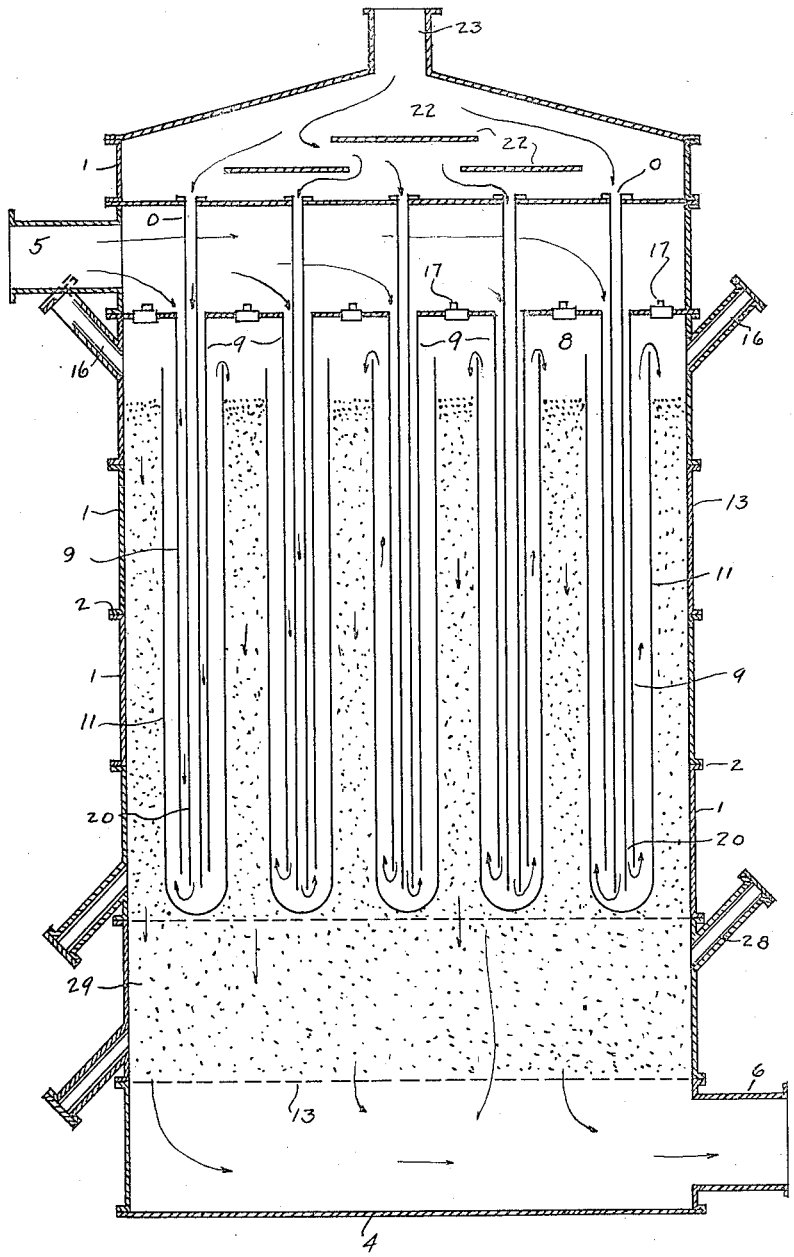

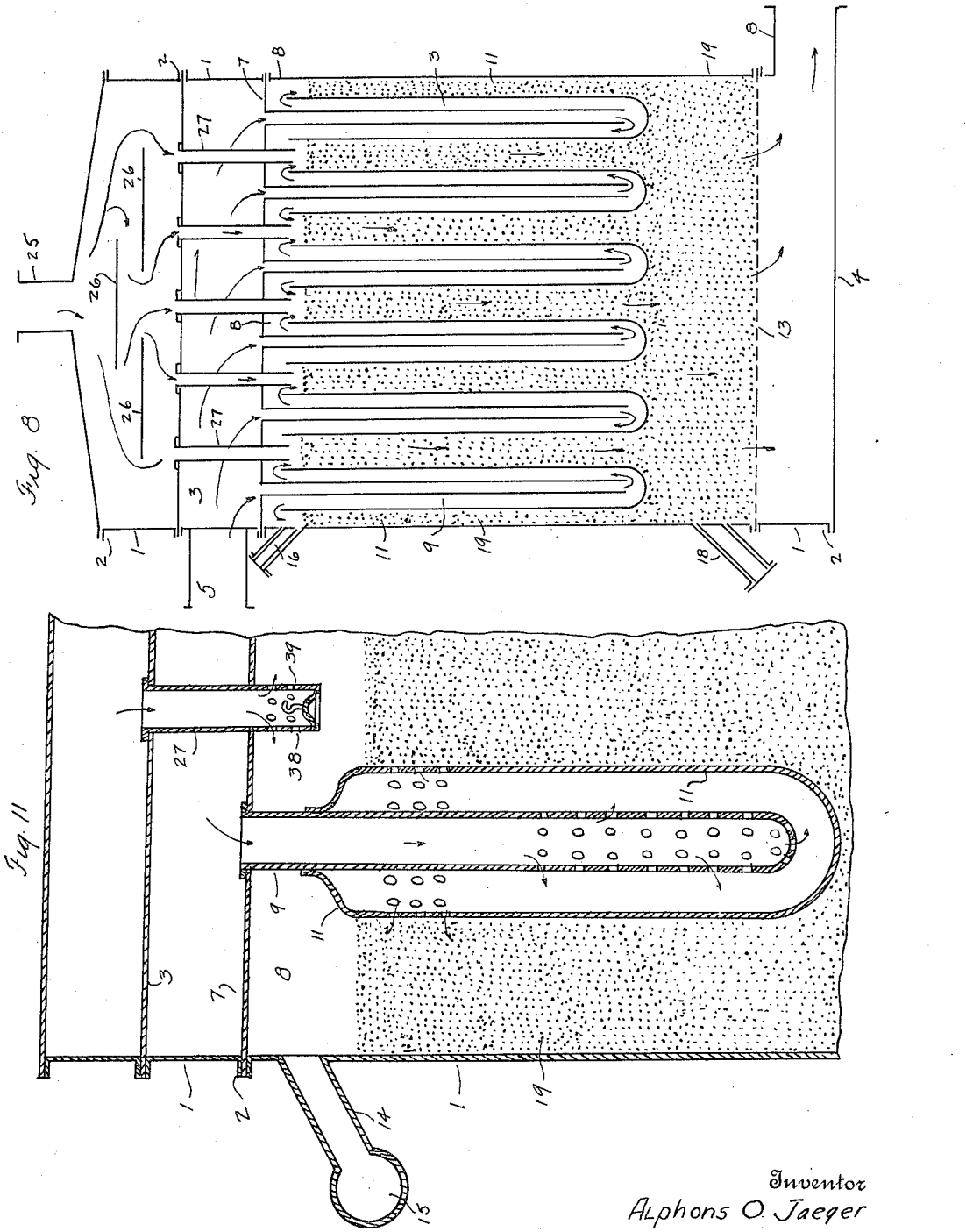

Aug. 1, 1933.  A. O. JAEGER  1,920,796
PURIFICATION OF ORGANIC COMPOUNDS
Original Filed Nov. 21, 1927  14 Sheets-Sheet 5
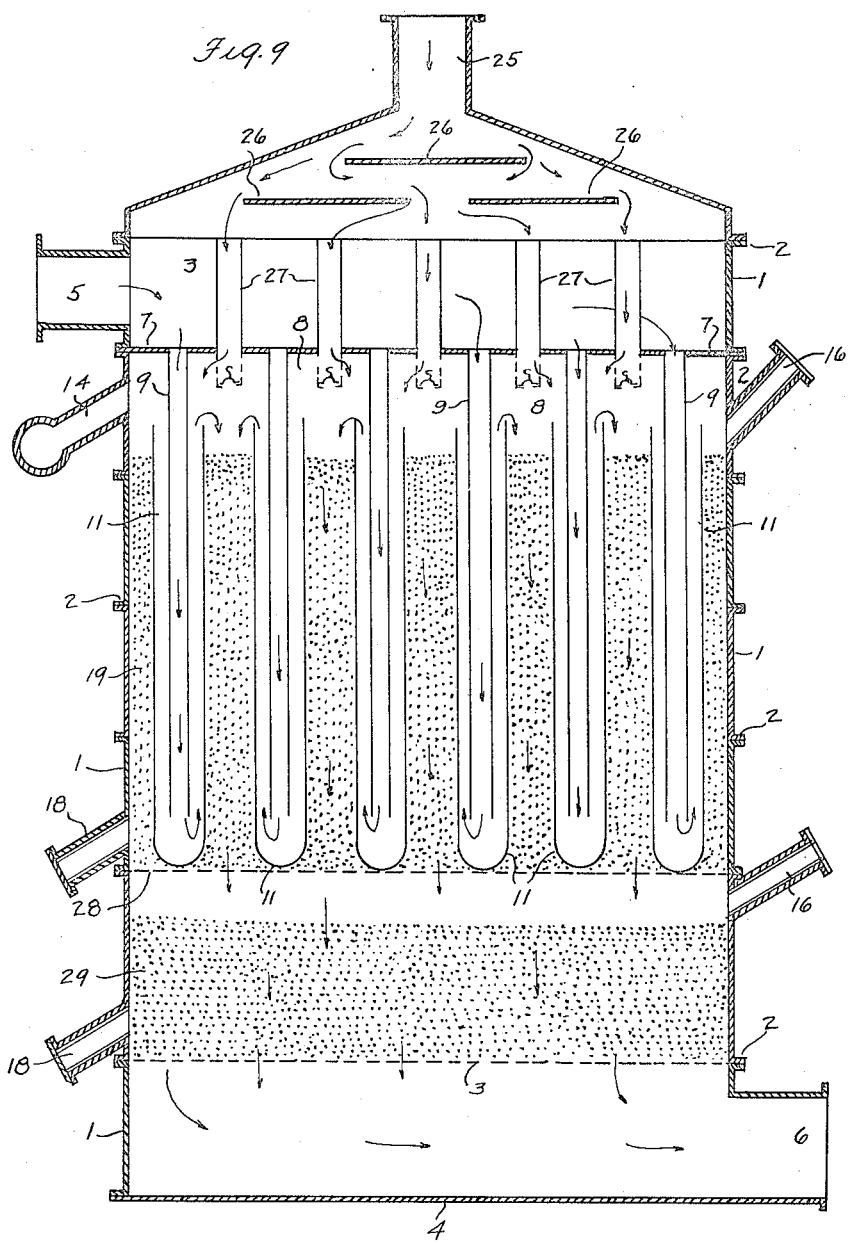
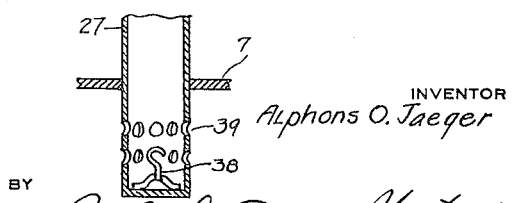
INVENTOR
Alphons O. Jaeger
BY
Robert Ames Norton
ATTORNEY

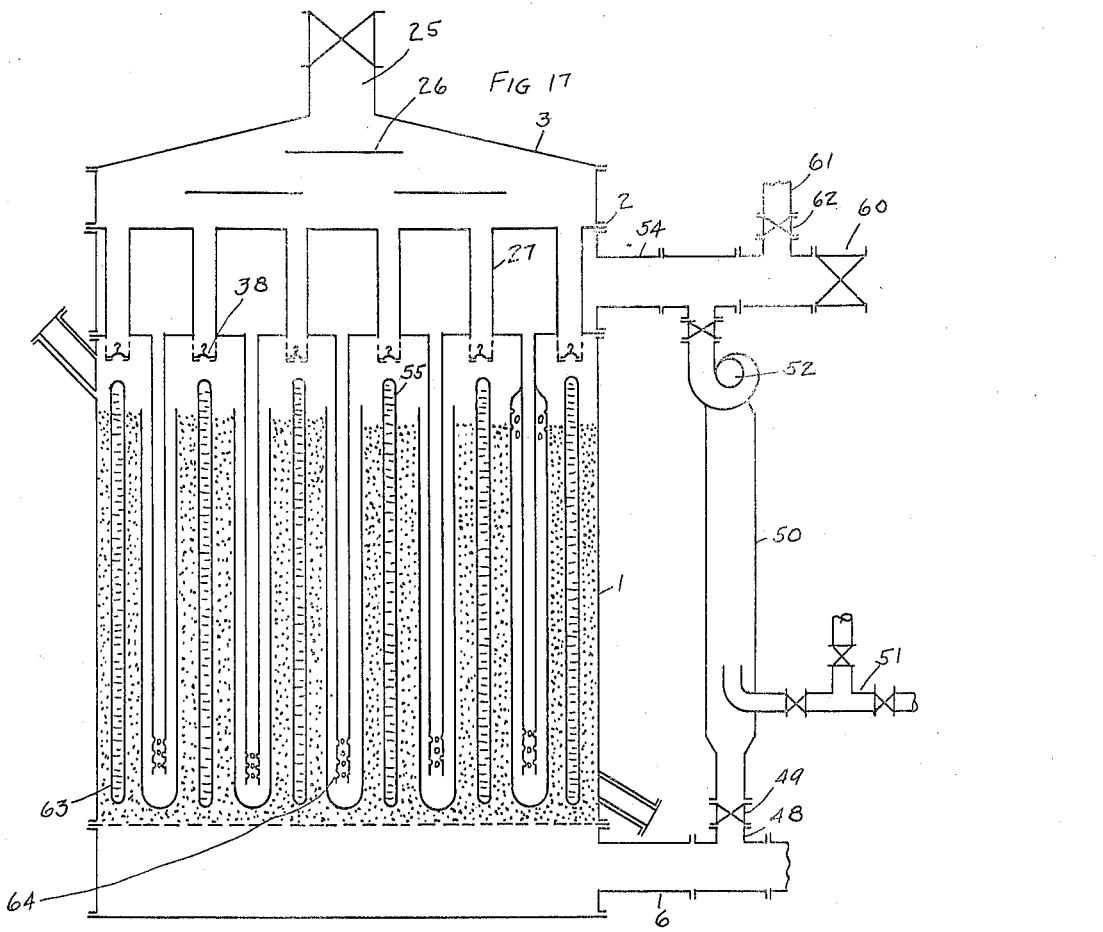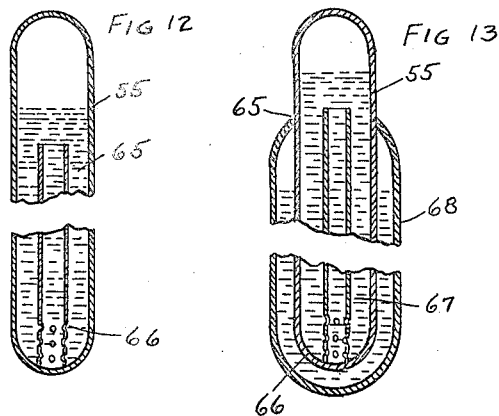

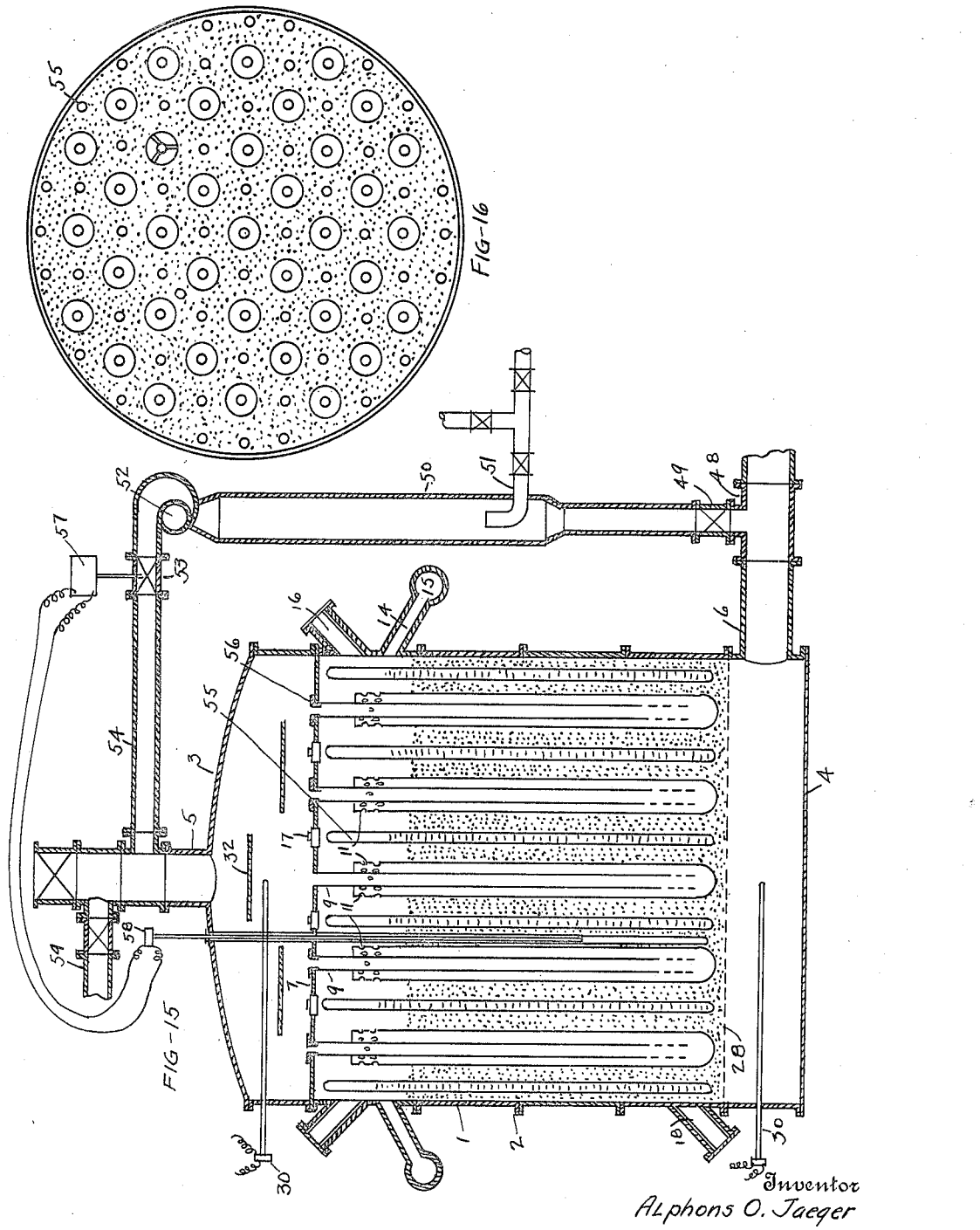

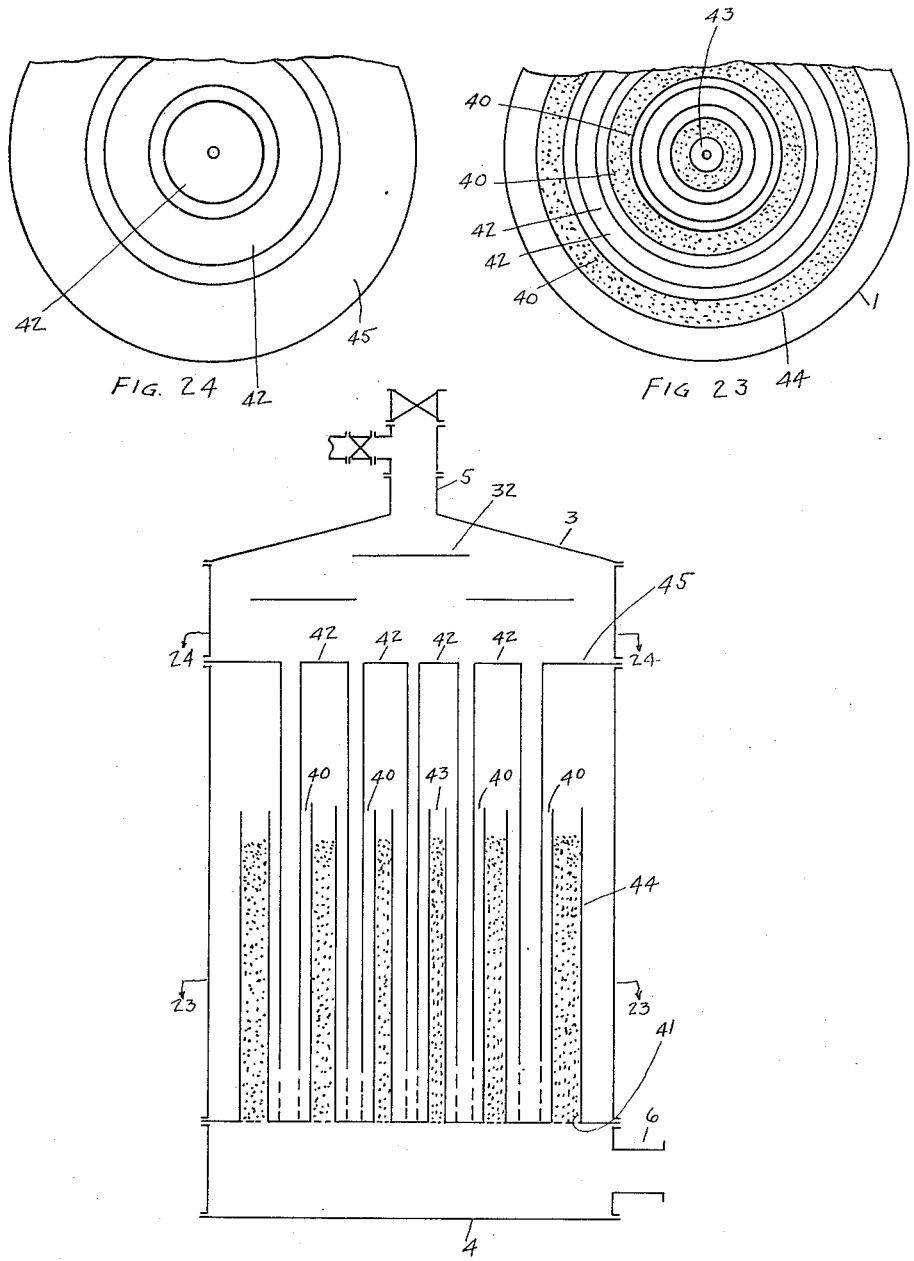

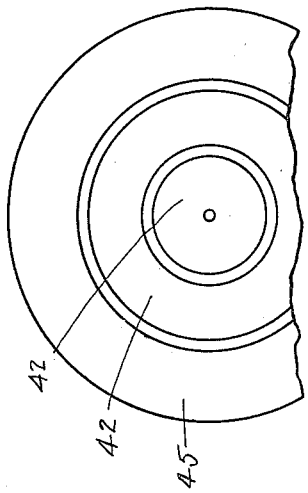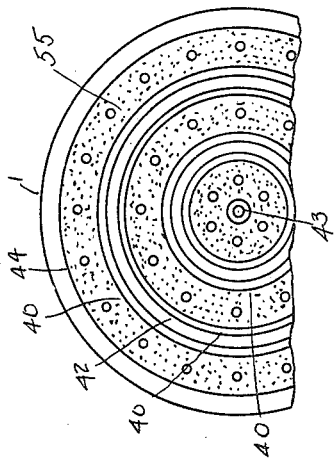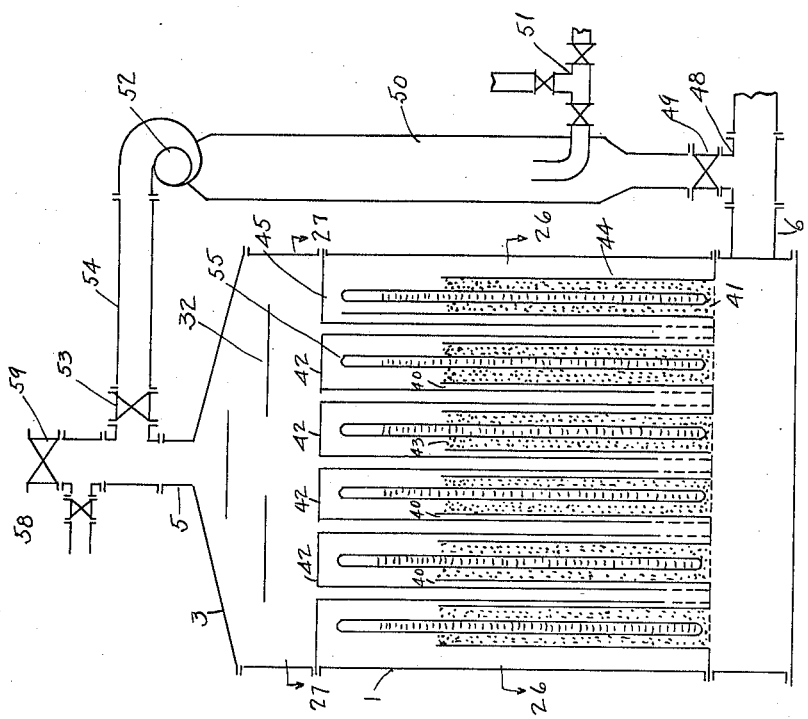

Alphons O. Jaeger INVENTOR

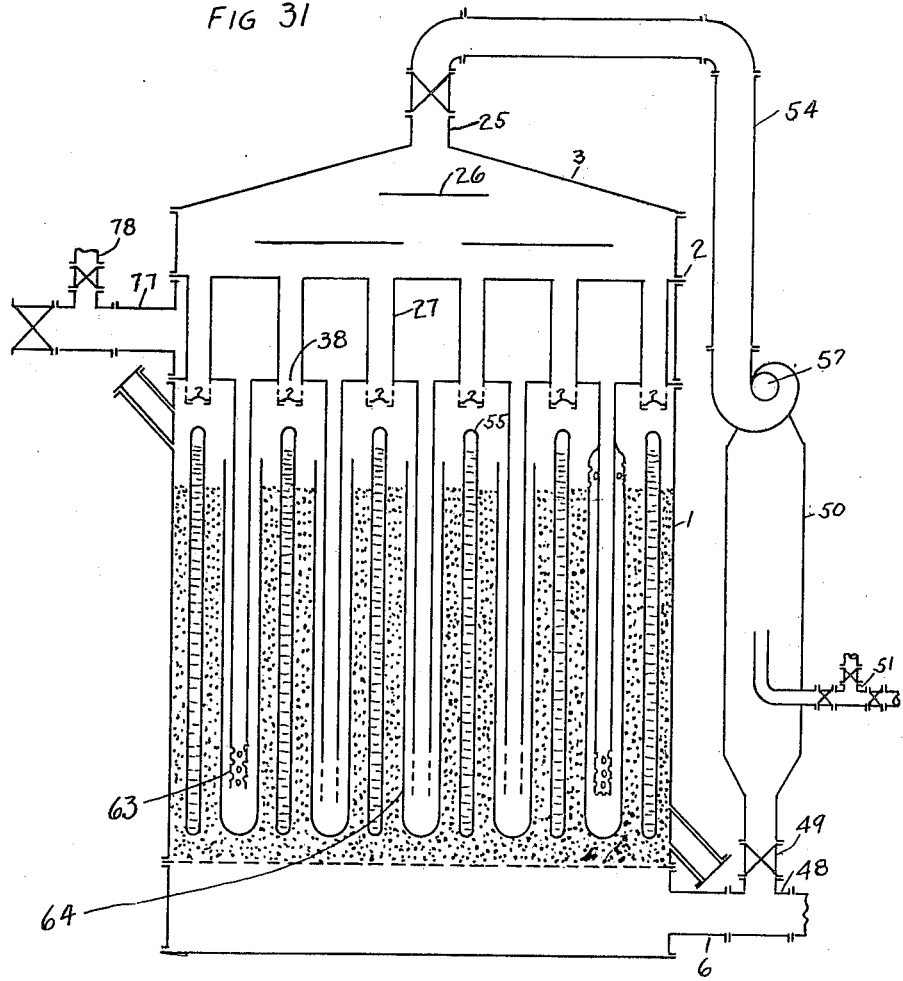

Patented Aug. 1, 1933

1,920,796

UNITED STATES PATENT OFFICE 1,920,796

PURIFICATION OF ORGANIC COMPOUNDS

Alphons O. Jaeger, Mount Lebanon, Pa., assignor to The Selden Company, Pittsburgh, Pa., a Corporation of Delaware Original application November 21, 1927, Serial No. 234,660. Divided and this application September 28, 1929. Serial No. 395,967

5 Claims. (Cl. 260—163)

This invention relates to processes of carrying out vapor phase catalytic oxidations of organic compounds and particularly such oxidations which by reason of the instability of the products produced or the heat evolved require close temperature control.

Many catalytic organic oxidations are strongly exothermic and require efficient cooling means to control the reaction and a number of the reactions are also sensitive by reason of the fact that in many cases intermediate products are obtained which are relatively unstable and tend to oxidize further unless the reaction conditions and particularly the temperature are carefully controlled. In the case of certain oxidation reactions in which a mixture of compounds are purified by the total combustion of certain impurities, a good temperature control is also necessary as in many cases the products which it is desired to leave intact tend to become oxidized if the temperature is unduly raised.

The necessity of better temperature control and in many cases the removal of large amounts of heat in strong exothermic oxidations has necessitated in the past the use of many elaborate schemes and also the use of expensive and frequently delicate and complicated apparatus. Thus, for example, many catalytic organic reactions have hitherto been carried out in converters provided with a large number of very small tubes surrounded by powerful cooling agents, for example, baths, boiling or non-boiling. Many of these converters are very expensive owing to their great complexity and present numerous disadvantages as it is difficult to keep such structures tight and the baths used for cooling, particularly when mercury or mercury alloys are used, require absolute tightness because the fumes of mercury are poisonous if permitted to escape and due to their high cost represent a heavy loss. Similar problems arise in connection with the use of other baths which may be readily attacked by air, which are inflammable or which tend to corrode the apparatus used.

The present invention is directed to a different method of cooling in which reaction gases furnish the main or primary cooling means and are circulated in heat exchanging relation to the catalyst in such a manner as to produce automatic heat control. This is effected in the present invention broadly by causing the reaction gases to circulate in double counter-current, first in indirect heat exchanging relation with the catalyst then, after reversal of flow, in direct heat exchanging relation with the catalyst and, finally, after a second reversal of flow, to pass through the catalysts. Preferably the first flow in indirect heat exchanging relation with the catalysts is also in direct heat exchanging relation with the counter flow of the gases. This may be effected either by circulating the gases through a large number of small, preferably tubular or square heat exchanging elements embedded in a catalyst layer or other arrangements and types of heat exchanging elements and catalyst layer may be used which produce the same type of cooling gas flow. A number of the modifications and modified forms of apparatus in which the principles of the present invention can be used are illustrated in the drawings in diagrammatic form. The double counter flow of the reaction gases through heat exchanging elements embedded in or associated with the catalyst layer or layers permits first an exceedingly cheap and simple converter construction eliminating by far the greater number of welded or gas-tight connections and it also presents great advantages in operation. First, relatively large catalyst layers are used which at once solves the problem of uniform catalyst permeability so serious when a large number of relatively small tubes are used. The second very vital advantage lies in the fact that reaction gases in cooling the catalyst are themselves gradually uniformly and efficiently heated up to the necessary reaction temperature without the necessity of using additional fuel.

The most important advantage of the present invention lies in the feature of automatic cooling. The heat evolved in vapor phase organic catalytic oxidations is directly proportional to the amount of reaction gases passed through the catalyst in a unit time, assuming substantially uniform conversion. The amount of primary cooling used in the present invention in which the reaction gases themselves constitute the cooling medium is also directly proportional to the amount of reaction gases flowing through. Therefore, once suitably adjusted for a given reaction the cooling is automatic and does not vary with fluctuations in loading over wide limits determined only by the range of loadings giving substantially uniform conversions and by the cooling factor of converter structure, such as the converter shell which in some cases can be substantially eliminated by thorough insulation or suitable heating. This feature is of the utmost importance in sensitive organic oxidations for it is in some cases difficult and in many cases impossible to provide for a perfectly uniform flow of reaction gases through the catalyst at all times.

Fluctuations, which in practical operation are frequently unavoidable, are automatically equalized by the cooling principles of the present invention. There is no danger therefore of fluctuations in the loading raising the temperature of the catalysts, which frequently tends to cause the oxidation to become uncontrollable and constitutes a serious problem in organic reactions due to the fact that frequently small increases in catalyst temperature will tend to greatly vary the course of the reaction, usually resulting in a greater amount of total combustion with a correspondingly still greater increase in heat, In other words the average organic oxidation, whether to an intermediate product or for the purpose of catalytically burning out certain selected impurities, is in unstable equilibrium and sudden increases in loading with concomitant evolution of heat tend to cause the reaction to become uncontrollable as the effects of increased loading become cumulative. It is for this reason that many converters used in the prior art have such powerful cooling means, as boiling baths, in order to prevent reactions from becoming uncontrollable. The problem is solved by means of the present invention with its automatic cooling feature in a simple and elegant manner.

It should be understood that it is not necessary to circulate all of the reaction gases in double counter-current heat exchanging relation with the catalyst although for many reactions this is the preferred method. In some reactions, however, it is desirable to heat up only a portion of the reacting gas and in such cases a portion only may be circulated in heat exchanging relation with the catalyst. In other cases it may be undesirable to subject certain of the reaction components to contact with the hot surfaces of the heat exchanger which, usually for the sake of cheapness, are made of iron, aluminum or steels. In such cases the air or oxidizing gas may be circulated through the heat exchangers and the organic substances may be introduced directly at any desirable temperature. Further modifications of flow may be used for chemical reasons or to improve the temperature control.

While it is an important advantage of the present invention that in the case of many reactions the simple automatic method of cooling by means of the reaction gases in a counter-current heat exchange with the catalysts may be used to control the reaction in an elegantly simple manner, the invention is in no sense limited to the use of this cooling means as the sole method of controlling the reaction and it may be associated with other methods, such as for example heat equalizing elements, which may be of homogeneous composition and high heat conductivity or which may contain liquids, whether boiling or non-boiling. Such means may be used to remove a portion of the exotherm of the reaction or they may serve solely the purpose of maintaining or equalizing the heat throughout the catalyst.

In some reactions the exotherm is so great that the total quantity of reaction gases does not possess sufficient heat capacity to remove all of the heat generated. In such cases it is necessary to provide for an additional heat removing means which may be of the most varied character, for example recirculation of part or all of the gases may be used so that a portion of the reacting and reacted gases are used more than once as heat removing agents. These methods also permit dilution of the reacting gases which is of importance in the controlling of many delicate reactions. A number of these auxiliary means are illustrated diagrammatically in the drawings and it is understood that the principle of the present invention may be applied either alone or in conjunction with other cooling or temperature controlling means whether new or old and it is an advantage of the present invention that it is extremely flexible and its principle may be utilized in conjunction with various types of converter structure. The extent to which the principles of the invention are used and the absence or choice of auxiliary cooling media in all cases will be determined by the skilled chemical engineer after a careful consideration of the requirements of the particular reaction or installation involved.

The great flexibility of the present invention permits a very uniform cooling of the catalyst by suitable placement of heat exchange elements, with uniform or non-uniform gas flows, and it is thus possible in many cases to achieve not only a total control of reaction but also a uniformity of reaction throughout the catalyst or zones thereof which is of great importance in increasing the yield and also in many cases in prolonging the life of the catalyst.

The automatic cooling provided in the present invention permits, as has been pointed out above, great variations of load and in many cases this may be translated into increased out-put. However, in some cases it may be desirable to restrict the out-put in order to still further improve the temperature control and the efficiency of the control in the present invention may therefore be used to either permit a greater loading, that is to say a greater gross out-put, or they may be used to provide a better percentage yield at the same gross out-put. In every case, however, an improved total output is obtained and the particular use which is made of the cooling features of the present invention must of course be dictated by the requirements of the particular reaction and the particular installation. The great flexibility of the present invention is of practical importance in its application to a wide field of catalytic organic oxidations.

The present invention has been described above more particularly in conjunction with highly exothermic organic oxidations and some of its most important applications are to be found in this field. It should be understood, however, that the present invention does not in its broader scope cover merely a cooling means but on the contrary should be considered as a temperature controlling means and even in reactions which are so slightly exothermic as to render outside heat necessary the principles of the present invention are equally applicable even though it may not be possible to save the use of fuel for heating. The present invention provides for a very reliable temperature control preventing not only excessive temperatures but tending also to prevent the temperature dropping too low and permitting the greatest possible utilization of the heat of reaction.

The invention will be described in greater detail in connection with a number of representative catalystic organic oxidations and in conjunction with the drawings which show in diagrammatic form a large number of modifications to which the present invention is susceptible but it is understood that the scope of the invention is not limited to the details shown therein. The present invention is not concerned with specific details of apparatus structure. The drawings are therefore purely diagrammatical in nature and in many cases may be considered almost in the light of reaction flow sheets. It should be understood, of course, that the skilled chemical engineer will design his converter and choose his apparatus accessories in accordance with the best practice of the art, following the principles outlined in the present invention.

In the drawings:

Fig. 1 is a vertical cross section through a converter showing the automatic gas cooling feature of the present invention;

Fig. 2 is a horizontal cross section through Fig. 1;

Figs. 3 and 4 are details of the method of supporting the heat exchange elements;

Fig. 5 is a vertical section through a modified converter of the type shown in Fig. 1;

Fig. 6 is a vertical section through a converter having an internal heat exchanger;

Fig. 7 is a vertical section through a converter with double heat exchange elements;

Figs. 8 and 9 are vertical sections through a modified converter provided with auxiliary gas introducing means.

Fig. 10 is a detail of the gas distributors shown in Fig. 9;

Fig. 11 is a detail of a converter with modified heat exchanger construction;

Figs. 12 and 13 are details of heat equalizing means shown in Figs. 15, 16, 17, 18, 25 and 28;

Figs. 15 and 16 are vertical and horizontal sections through a converter showing both circulation and heat equalizer means;

Fig. 17 is a vertical section through a modified type of converter of the general type shown in Figs. 15 and 16;

Fig. 22 is a vertical section through a modified converter of the general type shown in Figs. 19–21;

Figs. 23 and 24 are portions of horizontal sections along the lines of 23—23—24—24 of Fig. 22;

Fig. 25 is a vertical section of an annular heat exchange converter provided with recirculating and heat equalizing means;

Figs. 26 and 27 are portions of horizontal sections along the lines of 26—26—27—27 of Fig. 25;

Fig. 31 is a vertical section of a modified converter of the type shown in Fig. 14 provided with partial recirculation;

Figure 14:
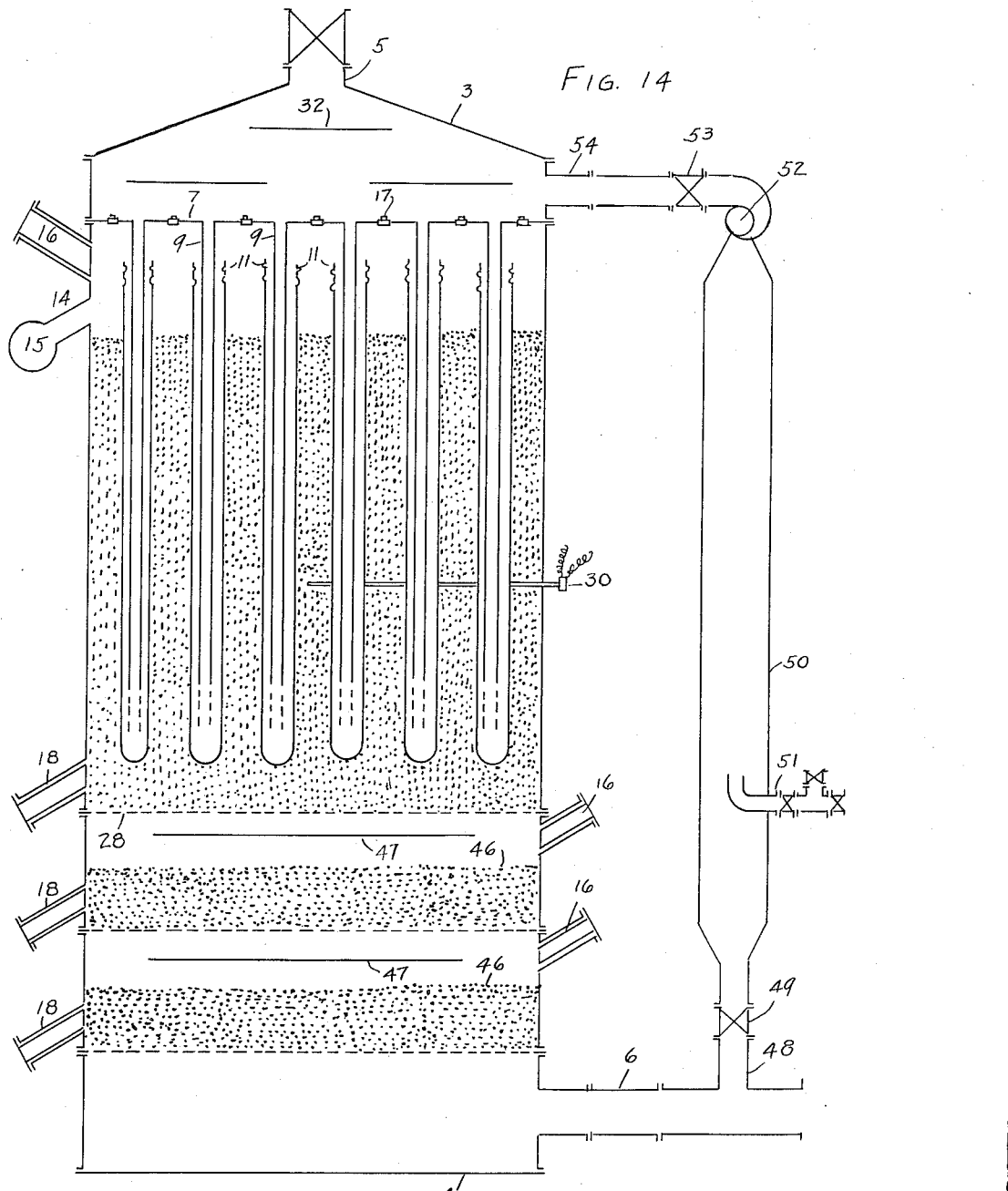
Fig. 14 is a vertical section through a converter showing recirculating means.

In the drawings in Fig. 1 the catalyst is shown in granular form but is conventionally shown by stippling in the remaining figures. It should be understood that the representation of the catalyst is only a conventional representation and the invention is not in any sense limited to the use of particular types or shapes of catalysts.

The converter shown on Fig. 1 consists of an outer shell formed of rings 1 provided with flanges 2 and connected to a top piece 3 and bottom piece 4. The reaction gases enter the top piece through the pipe 5, are distributed by means of the baffles 32 and thence pass down through the central cooling tubes 9 and then up in the outer cooling tubes 11 in the opposite direction. The tubes 11 are attached to the inner tubes 9 by any suitable fastening, such as a bayonet fastening illustrated in Figs. 3 and 4, the pin 10 entering into the bayonet slot in the tube 11. Other fastenings such as short chains, hooks and the like may also be employed. The inner cooling tubes 9 are, of course, firmly mounted in the top plate 7 and the alignment of tubes 9 and 11 may be preserved by spacing lugs 12.

The gases after passing up through the tubes 11 emerge through perforations at the top of the tubes into the upper gas space 8 and thence down through the catalyst 19. The catalyst is retained by the sieve or perforated bottom 13 through which the reacted gases pass into the lower space of the converter and thence out through the exhaust pipe 6.

Catalyst can be introduced either through the side openings 16 or through the openings in the plate 7 which are closed by the plugs 17. Catalyst can be removed through the outlet 18. The pipes 16 and 18 may, if desired, be filled with suitable inert material. Temperatures at various points are measured by the thermometric elements 30 which are illustrated in the form of electric pyrometers, but may, of course, be of any other suitable type. Where additional cooling gases are desired at the surface of the catalyst where the most violent reaction takes place, these gases may be introduced through the pipes 14 from the collector pipe 15.

In operation, the cold or cooled gases entering first pass down through the tubes 9 in indirect heat exchanging contact with the catalyst but in direct heat exchanging relation with the ascending gases in tubes 11. The gases are thus gradually warmed up and after emerging from the open end of tubes 9, they rise in tubes 11 in direct heat exchanging relation with the catalyst and in counterflow to the flow of gases through the catalyst. In the case of exothermic reactions, the catalyst is very hot and the gases in ascending the tubes 11 are rapidly and progressively heated, the rise in temperature being somewhat moderated by the cooling action of the downflowing gases in tubes 9 so that the gases emerging from the top of tubes 11 are not at an excessively high temperature. The heated reaction gases, with or without further addition of cool or cold gases through the pipes 14, then pass through the catalyst where the reaction takes place. The catalyst, however, does not become overheated as it is in intimate heat exchanging relation with the tubes and is cooled by the incoming gases. Too violent reaction in the upper zones of the catalyst is effectively prevented by the fact that the gases contacting with the upper layers of the catalyst are partly cooled by the gases in the tubes 9 and may be mixed with a suitable amount of cold or cooler gases through the pipes 14.

It will be seen that the converter heats up in a steady, regular manner the incoming cold gases and at the same time the catalyst itself is cooled. All of the heat of the catalyst, or substantially all, is thus utilized for heating the incoming gases and the manner of flow permits a very even cooling action, while at the same time the provision of the pipes 14 makes it possible to control sudden increases in temperature in the upper catalyst zones by a sudden and large increase in the inflow of cold or cooler gases. Where the reaction does not produce excessive heat per unit of reacting gases or where sudden overheating of the catalyst is not to be feared, the auxiliary cool gas pipes 14 may be dispensed with.

The heat evolved throughout the catalyst is, of course, by no means uniform since by far the greatest percentage of reaction and correspondingly of heat evolution takes place in the first catalyst layers and a rather steep temperature gradient may, therefore, exist in the catalytic layers from the top to the bottom. This temperature gradient is effectively utilized by causing the cold gases emerging from the bottom of the tubes 9 to come into heat exchanging relation first with a portion of the catalyst which is at a relatively low temperature and then, as they are heated up and as they rise in the tubes 11, the gases come into contact with progressively hotter and hotter catalyst so that at all times, the gases are subjected to a temperature differential sufficient to cause a large and steady flow of heat from the catalyst to the gases. At the same time, the excessive temperatures which might otherwise be produced in the upper catalyst layers are to some extent moderated by the fact that the rising gases not only absorb heat from the catalyst, but also give off a certain increasing amount of heat to the incoming cold gases in the tubes 9.

The converter shown in Figs. 1 to 4 is well suited for the catalytic purification of crude aromatic compounds by selective total combustion of impurities and illustrates the broad heat exchange feature of the present invention in its simplest form.

The catalyst for the purification of aromatic compounds may for example consist in ferrotitanium or mixtures such as for example a mixture of 8 parts freshly precipitated $Fe_2O_3$ and 8 parts of $TiO_2$ suspended in 100 parts of water and mixed with 14.2 volumes of 10 N KOH solution, the mixture then being sprayed onto 200 volumes of pea-size pumice fragments heated to a temperature sufficient to evaporate the water as fast as it is sprayed on.

The automatic heat exchange elements which are embedded in the catalyst are arranged and dimensioned so as to effect an excellent temperature control. This is preferably effected by so arranging the tubes that the spaces between the closed end tubes 11 amount to about 2—2.5 cm. and therefore the contact mass surrounding the elements is at no point more than about 2—2.5 cm. from the nearest cooling surface. Preferably the inner tubes 9 are so chosen as to leave as narrow an annular space between them as possible in order to provide for a rapid gas flow so that the heat exchange between the catalyst and the reaction gases is a maximum.

Crude anthracene uniformly vaporized in air at 240–260° C. in the proportion of one part anthracene to 20–30 parts by weight of air enters the converters through pipe 5 and passes through the automatic heat exchange elements where it is heated up to 370–400° C. by the catalyst. This range of reaction temperatures is very favorable and the gases then flow through the catalyst and catalytic total combustion of some of the impurities, particularly carbazol, takes place. It can readily be ascertained by the thermocouples 30 that at no time does the temperature exceed 440° C. in the catalyst in normal operation. If the temperature in the contact mass, particularly in the upper third should exceed 440° C.

by reason of abnormal operation, additional air at 250° C. can be introduced through the manifold 15 and pipes 14 thus adjusting the temperature both by the cooling effect of the gas and by its diluting effect on the reaction mixture. A very uniform selective oxidation is obtained in the converter shown and the reaction product can be recovered either in condensing chambers or by means of steam or water spray. The purified anthracene contains from 65–75% anthracene and the yields are in excess of 90%. An analysis shows that carbazol is substantially completely removed and the main impurity remaining is phenanthrene. By recrystallization from solvent naphtha phenanthrene can be removed from the anthracene resulting in a 95–97% anthracene which is almost colorless and which is well suited for the production of anthraquinone.

Instead of using crude anthracene, the product can first be recrystallized from solvent naphtha in order to first remove the phenanthrene. The remaining crude anthracene, containing from 59–61% anthracene, 34–36% carbazol and 4–5% phenanthrene, is vaporized with air in the proportion of 1:35 to 1:40 by weight at a temperature of 240° C. The mixture is then passed through the converter as described above and results in high yields of a product containing 94–96% anthracene.

Crude phenanthrene may also be purified in the same type of converter. For example, phenanthrene which is obtained by recrystallization of crude anthracene from solvent naphtha, containing about 7.5–8.5% anthracene, 10.5–11.5% carbazol and 80–82% phenanthrene, is purified and passed through the converter as described above. Preferably the temperature in the contact mass should not be permitted to materially exceed 400° C. The carbazol is burned out and a phenanthrene is obtained which contains anthracene as practically its only impurity. The reaction product can then be recrystallized from alcohol which removes most of the anthracene and a very pure phenanthrene is obtained.

Crude anthracene from other sources may be catalytically purified by the methods illustrated in Figs. 1 to 4.

The contact mass described above and arranged as shown in Fig. 1 may also be used for the catalytic purification of crude naphthalene resulting in the selective oxidation of oily impurities such as phenol and sulfur compounds. The reaction conditions are obtained by vaporizing crude naphthalene with air in the proportion of 1:30 to 1:40 by weight and causing the mixture to enter the converter at a temperature of 180–200° C. and in sufficient quantity to provide a very high gas speed in the automatic heat exchange elements in order to prevent local accumulation of heat in the catalyst. The purified naphthalene obtained by this process is practically colorless.

The preheating of air or reaction gases which has been mentioned above may be effected in any suitable manner, for example by using a heat exchanger external to the converter in which the gases after passing through the converter serve to give up part of their heat to the incoming gases. The particular design of the heat exchanger used forms no part in the present invention and any suitable type can be used in which the gases flow parallel or in countercurrent. The combination of an external heat exchanger with the internal automatic heat exchange elements permits a very effective temperature balance and assures uniform preheating of the reaction gases to the desired reaction temperature in a simple and economical manner.

Figures 5 and 6 illustrate modified converter forms. Figure 5 illustrates a modification in which the tubes 11 extend substantially throughout the catalyst layer and accordingly the whole of the catalyst is cooled. This construction is desirable in certain reactions where it is necessary to maintain a relatively low temperature throughout the whole of the catalyst and where it is undesirable to slow up the gas passage through the catalyst at any point in order to prevent side reactions or other deleterious effects. The operation of the converter in Fig. 5 is, of course, identical with that described in Fig. 1.

Fig. 6 shows a means of using the heat of the exhaust gases by extending both tubes 9 and 11 beyond the lower perforated plate 13 into the exhaust chamber of the converter. Baffles 33 may be provided in order to bring the exhaust gases into more intimate heat exchanging contact with the tubes 11.

The converter shown in Fig. 6 is of advantage where it is desired to maintain an even temperature gradient throughout the whole of the catalyst and where it is necessary to preheat the incoming gases to a relatively high temperature. The converter is also very advantageous for use in connection with reactions in which the final products are unstable at high temperatures and where it is desirable to rapidly cool the exhaust gases.

The converters shown in Figures 5 and 6 may be shown in the reaction described in connection with the converter shown in Fig. 1. Under conditions where the material to be purified is relatively unstable the construction of Fig. 6 is particularly suitable since the reaction products emerging from the catalyst are immediately cooled by contact with the extended automatic heat exchange elements.

Fig. 7 illustrates a different type of converter in which two separate cooling gases are used instead of one. The second cooling gas enters the upper converter chamber 22 through the pipe 23 and is distributed by means of the baffles 32 to the tubes 20 which are concentric with the tubes 9. The first gas is introduced into the tubes 9 through the pipe 5 and upper chamber 3. The two gases mix at the bottom of tubes 9 and 20 and the mixed gases ascend through the tubes 11, the cooling effects on the catalysts being, of course, similar to those described in connection with Fig. 1.

Fig. 7 also illustrates the use of two separate catalyst layers 19 and 29 separated by the perforated plate or screen 28. The catalyst layers may consist of different catalysts for effecting the same reaction or they may consist of different catalysts for effecting different reactions. Thus, for example, if a catalytic reaction proceeds in two stages, the first being strongly exothermic and the second being weakly exothermic or even endothermic, a converter such as that illustrated in Fig. 9 can be very effectively used, the exothermic reaction being controlled by the cooling in the tubes and the endothermic or the weakly exothermic reaction utilizing the heat which has been imparted to the gases by their passage through the catalyst layer. An example of such a reaction is the catalytic purification of a crude mononuclear aromatic hydrocarbon followed by the catalytic oxidation of a side-chain thereof to produce an aromatic aldehyde or ketone. Obviously, of course, the arrangement of layers can be reversed and more than two layers can be used. The use of a plurality of layers is also not limited to the particular cooling tube construction shown in Fig. 9 and can be applied to the cooling construction shown in the other figures. An attempt has been made to illustrate as many conditions as possible in a minimum number of figures and the association of one feature with other features in the same figure should not be taken as a limitation, since, as in the case of Fig. 7, the use of a plurality of catalyst layers may be applied equally to the construction shown in the other figures. However, in certain figures, certain combinations of features may be advantageous for particular reactions and while in its broader aspects the invention is not limited to combinations in any single figure, in more specific aspects these combinations are included within the purview of the invention.

Fig. 8 illustrates a converter provided with means for introducing two gases, one from the space 3 into the tube 9 has been described in previous figures, and another portion of gas through the pipe 25 which gas is distributed by the baffles 26 and passes down through the pipes 27 directly into the catalyst space so that a stream of cold or cooler gases strikes the upper portion of the catalyst. This type of converter is very useful in reactions where a great portion of the heat is developed in the first few inches of catalyst and overheating is prevented by the streams of relatively cold gas striking this hot portion of the catalyst. A very even and efficient control of temperature can be brought about by means of this type of converter and where the gases entering the space 3 are preheated they serve to slightly heat the cooler gases passing through the pipes 27 and are at the same time somewhat cooled down. The hot gases emerging from the pipes 11 also mix immediately with the cooler gases from the pipes 27 and a uniform temperature control can be easily effected.

A similar design of converter is shown in Fig. 9 but the mixing of gases coming from the pipes 27 with the gases emerging from the pipes 11 is effected by causing the gases to emerge from the pipes 27 in a more or less horizontal direction. This is brought about by removable bottoms 38 in the pipes 27 which force the gases to pass out through the perforations 39 in the tubes, thus effecting a more uniform mixture of the two gases and preventing jets of relatively cold gas from striking the catalyst surface, as may readily occur in the design shown in Fig. 8 when the gas velocities through the pipes 27 are high. A detail view of the bottom of the pipes 27 is shown in Fig. 15.

The converter shown in Fig. 9 also illustrates the use of two different layers of catalyst, one layer being cooled by the tubes 11 and the other being uncooled. In both figures 8 and 9, the catalyst can be charged into the converter not only through the charging opening 16 but also through the pipes 27 after removing the bottoms 38 in the case of the converter shown in Fig. 9. It is advantageous for some purposes to charge through these tubes in order to effect a more uniform distribution of catalyst.

Fig. 10 shows a detail of the tubes 27 provided with the baffle plates 38 and perforations 39, which prevent a blast of cold gas directly striking the catalyst.

Figures 7, 8 and 9 show converter and gas introducing arrangements which are suitable for purifications in which the material to be purified is very resistant to decomposition in the presence of the catalyst used. Thus for example, by use of specially damped catalysts particularly in the uncooled catalyst layers, reactions such as the catalytic purification of anthracene under conditions described above may be carried out, particularly where the catalyst power varies in the direction of gas flow or the catalysts possess different specific activities.

The particular construction shown in Figs. 8 and 9 permits adjustment of the temperature of the gases after passing through the automatic heat exchange elements before they contact with the catalysts, this adjustment being effected by the direct introduction of additional gases through the tubes 27. This possibility of adjustment is very important, as the initial temperature of the gases contacting with the contact mass is one of the most important controllable factors. Not only can the temperature of the reaction gases be varied at will but the concentration can be varied by the addition of different amounts of auxiliary gases, which results in a very desirable flexibility of converter operation.

Fig. 11 shows a modification somewhat similar to that of Fig. 9 but instead of using an outer tube 11 open at the top in the automatic heat exchange elements, this tube is closed at the top and is provided with suitable perforations just below the level of the catalysts so that the heated gases pass out into the catalyst without mixing with the cool gases coming through pipes 27. The inner tube 9 is shown perforated but may also be solid with open bottom. The perforation of the inner tube 9 permits the incoming gases to escape over a larger area and therefore prevents creation of a cold spot at the bottom of tube 11 as sometimes may take place when the full blast of the incoming gases strikes the bottom of this tube.

The arrangement shown in Fig. 11 is well adapted for catalytic purification of crude anthracene or of crude naphthalene. The perforations of the inner tube permit very uniform cooling of the contact mass and the perforations in the tube 11 permit the gas to pass into the contact mass throughout a larger area and therefore prevent accumulations of heat at the point where gases first encounter the catalysts and where, of course, the reaction and consequently the evolution of heat is a maximum owing to the high concentration of reacting components. This arrangement also permits a very satisfactory control of the composition and speed of flow of the gases.

Since the converters used in carrying out the process of the present invention are of exceedingly cheap construction and do not require gas tightness in the heat exchange elements, it is advisable to work with large amounts of catalysts and spread the reaction over a large amount of contact mass, for example by increased velocity of gases which may be effected by greater air dilution. In this manner the strongly exothermic catalytic reaction can be carried out under conditions which do not favor local over-heating and the automatic heat exchange elements serve to maintain a uniform reaction condition which permits high yields.

The spacing of the external tubes of the automatic heat exchange elements should preferably not exceed 3 cm. as the heat conductivity of the catalyst is not very high and a uniform temperature throughout the catalyst can not be obtained if the heat exchange elements are placed too far apart.

Figs. 19 to 24 show a type of converter in which the flow of the gases in heat exchanging relation with a catalyst follows the same principles as in Figs. 1 to 11 but the converter arrangement is quite different. As in Fig. 1, the converter consists in a shell 1 and top piece 3, bottom piece 4, gas entrance pipe 5, exit pipes 6, distributing baffle plates 32. Instead of providing a partition in the upper portion of the converter in which the automatic heat exchange elements are hung, a similar effect is obtained by providing annuli with one end open and being of different size and arranged to fit into each other. Thus, shorter concentric annuli 40 are nested with their closed ends resting on a perforated bottom support 41 and larger annuli 42 are likewise nested with their open ends, which are preferably perforated, fitting into the open ends of annuli 40. It will be apparent, of course, that the center of the annuli 40 is taken up with an open end tube 43 and the outermost annuli, both long and short, are halved and utilize the converter shell 1 as one of their walls. These built-up annuli are numbered 44 and 45 respectively. The catalyst is placed between the annuli 40. While the converter structure is radically different from that shown in Fig. 1, an examination of the vertical cross section in Fig. 19 will make it apparent that the gas flow is the same, that is to say the incoming gases through the pipe 5 flow down the annular spaces between the annuli 42, reverse their flow and pass up between the walls of the annuli 42 and the annuli 40, or in the case of the central annulus 42 the gases pass down through the tube 43, reverse their flow and pass up through the annular space between this tube and the closed end tube 43. The first flow is in indirect heat exchanging relation with the catalyst and on reversal of flow the gases pass in direct heat exchanging relation with the catalyst and also with the incoming gases on the down flow and then on a second reversal the gases pass through the catalyst. In other words, in Fig. 19 instead of a series of circular automatic heat exchange elements with double counter flow all but one of the heat exchange elements are annular instead of circular. This construction presents some advantages for certain converter sizes and the control due to the fact that a surface of heat exchange element in contact with catalyst compared to catalyst volume is greater than with circular elements of the same area, and somewhat more uniform control of the heat evolved may be obtained and is of importance in many reactions.

Figure 20:
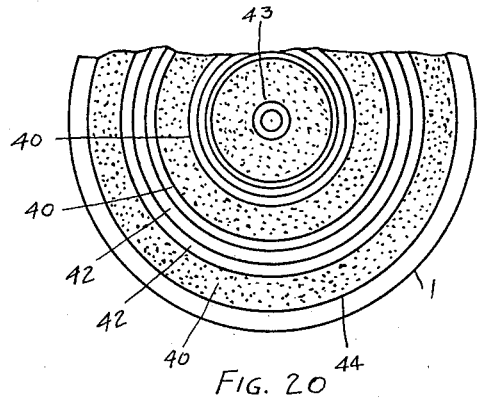
Figure 19:
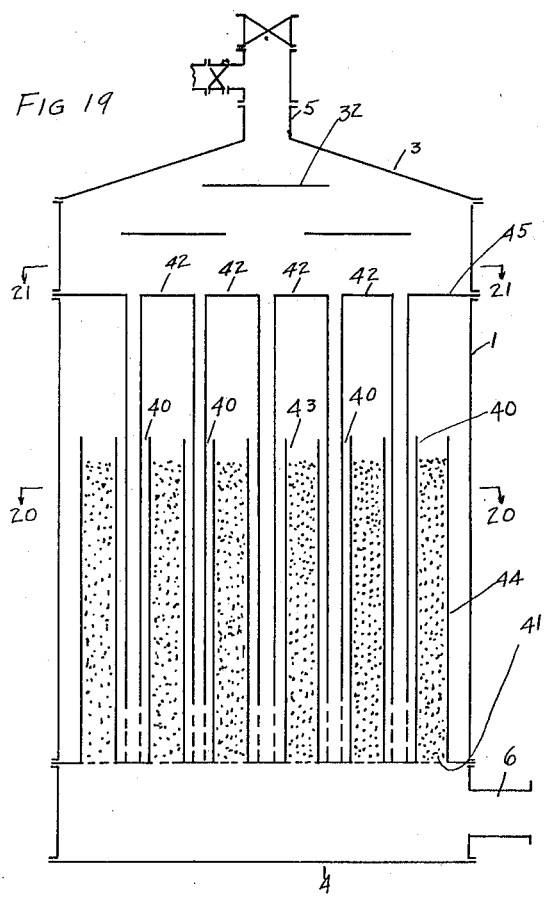
Fig. 19 is a vertical section through a converter having annular heat exchange elements.

Figs. 22 to 24 show a converter having the same construction as that shown in Figs. 19 and 20 but instead of uniformly spaced and shaped annuli the spacing and shape is varied so that the thickness of the annular catalyst zones is decreased from the periphery of the converter toward the center. This permits a more uniform control where the cooling effect of the converter shell is considerable.

Converters of the type shown in Figs. 19 to 24 can be used for the reactions described in connection with the converter shown in Figs. 1 to 11 under the reaction conditions therein set forth and are particularly effective for the catalytic purification of crude aromatic hydrocarbons, such as for example transforming crude anthracene into high grade anthracene; crude naphthalene into highly purified naphthalene, crude benzol to highly purified benzol, crude phenanthrene to high grade phenanthrene, etc.

Figs. 14 to 17 illustrate modifications using control means in addition to the primary automatic heat exchange elements. These converter types, which are particularly important for highly exothermic reactions utilize in addition to the heat exchange elements recirculation of part or all of the reacted gases. A simple construction is shown in Fig. 14 in a converter resembling that shown in Fig. 9 and having corresponding parts bearing the same numbers. This converter contains a cooled catalyst layer provided with simple automatic heat exchange elements followed by two uncooled catalyst layers 46, each being preceded by a baffle plate 47 which causes the gases passing out from the catalyst layer through the perforated separating screen 48 to be deflected toward the outer shell of the converter where they are partially cooled before passing through the first uncooled catalyst layer and whereby they are also thoroughly mixed. A similar baffle plate placed before the second layer also performs the same function. Instead of permitting all the reacted gases to pass out through pipe 6, all or a portion is recirculated through the branch pipe 48 controlled by the valve 49 into the mixing chamber 50 where the composition of the gases may be suitably adjusted if desired by means of the pipe 51, which is provided with valves and branches to permit the introduction of a plurality of gases. From the mixing chamber the gases pass into the suction of pump 52 which may preferably be of the blower type as illustrated in the drawing. From the pump the gas passes through the pipe 54 controlled by the valve 53 into the upper space of the converter and are thence recirculated through the automatic heat exchange elements together with fresh gases which may be introduced through the valved pipe 5. It is thus possible by recirculating part of the reacted gases to maintain the concentration of the reacting components within any suitable range and this is a most effective method of control as it decreases the amount of heat evolved per unit of gas passed through the converter. This simplifies the control which is effected by the automatic heat exchange elements. The automatic heat exchange maintains the catalyst temperature constant within wide ranges of loadings but where the exotherm of the reaction with high concentration of reacting components is greater per unit of reacted gas than that necessary to heat the same amount of gas from the entrance temperature to the reaction temperature, it is obvious that overheating must take place. Control of this latter factor is most effectively achieved by recirculation which varies the concentration of the reacting gases and, therefore, the amount of heat evolved per unit of gas so that the automatic heat exchange devices can satisfactorily control exothermic reactions in which the heat evolved at high reaction gas concentrations is greater than necessary to heat up the incoming gases.

While it is possible to control the exotherm of any reaction, no matter how great its heat evolution, by suitable recirculation, it is difficult to achieve perfectly uniform reaction temperatures throughout the whole of the catalyst, especially where the fresh reaction gas composition varies to a certain extent. A similar problem confronts the catalytic chemist when dealing with an organic oxidation in which the reaction takes place almost exclusively in the portion of the catalyst first encountering the gases. In such cases the powerful cooling of the automatic heat exchange elements may result in a sharp temperature gradient through the catalyst. It is desirable to equalize the temperature gradient and for this purpose elements which I term "heat equalizing elements" are preferably associated with the catalysts as shown at 55 in Figs. 15 to 18. These heat equalizing elements are preferably structures of high heat conductivity. They may be metal rods or hollow metal bodies filled with liquids of high heat conductivity, such as metals, metal alloys, and eutectic mixtures of salts. The use of liquids, such as mercury or mercury alloys, particularly those which boil at or near the reaction temperature, in some cases enhances the effectiveness of these heat equalizing means but for some purposes, particularly where it is desirable to transfer heat downwardly instead of upwardly, solid metal structures, for example aluminum or other metal rods are preferable.

Figs. 15 and 16 illustrate a simple converter with recirculation and heat equalizing means. The automatic heat exchange elements shown in this converter are of a simple type but are shown with orifice plates or plugs 100 in order to vary the relative amount of gas flowing through the heat exchange elements. This feature is, of course, equally applicable to any of the modifications using tubular heat exchange elements where the cooling due to the converter shell is a considerable factor, by varying the amount of gas passing through the different heat exchange elements so that the central elements receive a heavier gas flow and the cooling can be rendered uniform throughout the catalyst. This figure also shows some improvements over Fig. 14 in that the valve 53 is automatically controlled by suitable electric or other relays actuated by the thermocouple 58 or other means. The temperature within the catalyst, therefore, determines the amount of recirculation which automatically prevents overheating. The pipe 54 also discharges into the pipe 5 instead of directly into the top converter space which is advantageous for many reactions as thereby a more thorough mixture of fresh gases is effected. The pipe 5 is provided with a suitable valved branch pipe 59 to permit the introduction of a plurality of fresh gases. Obviously, of course, all of the fresh gases may be introduced into the mixing chamber 50 through the pipe 51 where this method is desirable.

Instead of simple heat equalizing elements complex heat equalizing elements may be used as shown in Figs. 12 and 13. In Fig. 12 the heat equalizing tube is filled with a liquid and a central circulating tube 65 extends from the bottom to just below the upper surface of the liquid. The bottom of the pipe is provided with inlet perforations 66. Obviously this type of element will result in a more vigorous type of circulation which is desirable where the main function of the heat equalizing element is to convey heat upward. This is particularly important where a reaction takes place in the lower part of the catalyst which is more violent or sensitive than that taking place in the upper part of the catalyst or where a larger proportion of the reaction takes place in the lower part of the catalyst. In Fig. 13 the type of heat equalizing element is further provided with a jacket 67 containing a liquid 68, preferably of high heat conductivity. This increases the surface of the heat equalizing element in contact with the catalyst and where a relatively expensive low boiling metal or alloy is used in the tube 55 the amount of such material can be greatly reduced as the liquid 68 does not have to boil and may be much cheaper, for example a lead bath.

Fig. 17 shows recirculation and heat equalizing means applied to a converter of the type of Fig. 9 in which part of the reaction gases, including the recirculated gases, are permitted to pass through the automatic heat exchange elements whereas a further portion of fresh reaction gases are directly introduced through the pipes 27. Fresh gases which are to pass through the heat exchange elements may either be introduced into the mixing chamber 50, through the pipe 51, or they may be introduced into the pipe 54 either by manipulation of the control valve 60, or, if a plurality of reaction gases is to be introduced, a part of them may pass in through the branch pipe 61 controlled by the valve 62. The automatic heat exchange elements are shown as consisting of several types, one similar to that shown in Fig. 11 and others having central tubes 9 provided with perforations 63 or slots 64. Operation of the converter is, of course, the same as in the preceding figures but combines both the features of the converter shown in Fig. 9 and recirculation and heat equalizing means.

Figure 18:
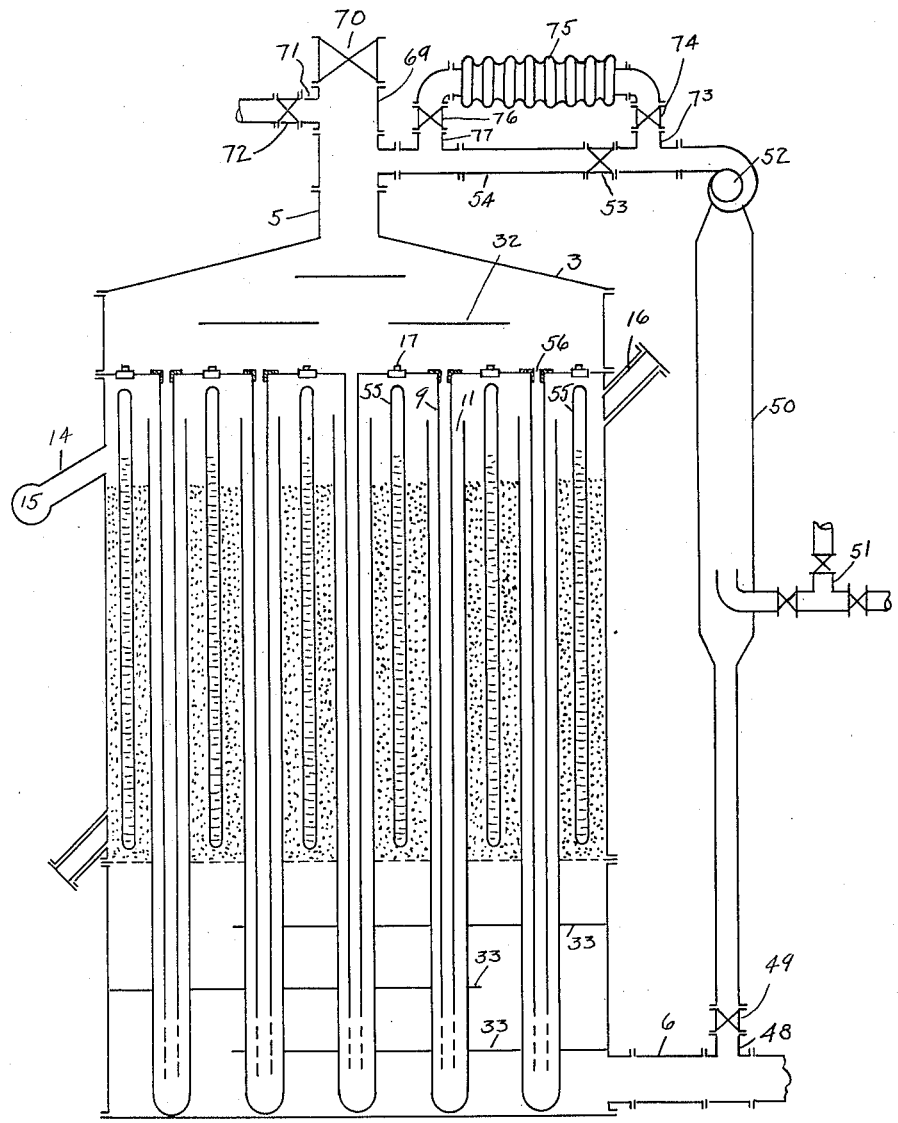
Fig. 18 is a vertical section through a converter showing circulating means with external cooler and internal heat exchanger.
Figure 21:
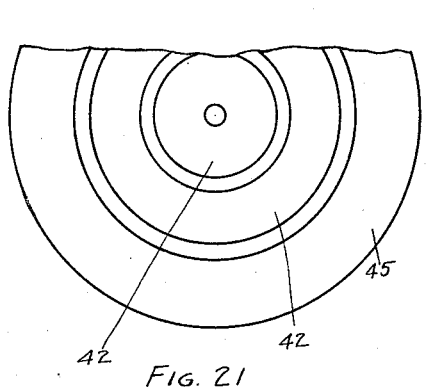
Figs. 20 and 21 are horizontal sections along the lines of 20—20—21—21 of Fig. 19.

Fig. 18 illustrates a converter of the type shown in Fig. 6 provided with heat equalizing means and recirculation. The arrangement of recirculating means is substantially the same as in Fig. 15 but instead of introducing the recirculated gases without special cooling a bypass cooler 75 is provided that connects with the pipes 54 through the pipes 73 and 77, controlled by valves 74 and 76. The fresh gases passed into the pipe 5 through the pipe 69 may also be controlled by the valve 70 in the latter, or additional gases may be introduced into the pipe 69 through the branch pipe 71, controlled by the valve 72. Uniform cooling is effected by the provision of suitable orifice plugs 100 as described in connection with Fig. 15.

The converter arrangement and gas flow in Fig. 18 is particularly suited for strongly exothermic reactions and for reactions which are delicate and in which a very accurate temperature control is necessary. The temperature of the fresh gases and recirculated gases can be accurately controlled, if necessary automatically, and very uniform reaction conditions can thus be obtained.

The combined features of circulation and heat equalization, as illustrated in Figs. 15 to 18, permit the carrying out of the most sensitive reactions, thus for example, undesired impurities may be burned out of mineral oils in the vapor phase and the oil itself subsequently cracked using contact masses having specific efficiency for the various steps.

Another reaction which is carried out in stages and for which the converter types are well suited is the transformation of crude anthracene into anthraquinone in a two stage reaction in which crude anthracene is purified by the total combustion of carbazol and some of the other impurities in the first stage and the purified anthracene is then oxidized to anthraquinone in the second stage. Excellent yields of very pure anthraquinone can be obtained by this method especially when a crude anthracene relatively free from phenanthrene is used. If desired, however, crude anthracene, for example 30% anthracene, may also be used but will give a product which sometimes is not completely free from oxidation products of phenanthrene. It is preferable, therefore, to treat crude anthracene with solvents, such as solvent naphtha, to remove most of the phenanthrene, as not only is a purer product obtained but it is possible to recover the phenanthrene.

The first layer of the contact mass in which anthracene is purified by total combustion of carbazol may preferably consist of 200 volumes of pumice fragments impregnated with a suspension of 4 parts of CoO, 4 parts of CuO, 4 parts of $Fe_2O_3$, 2 parts of $Al_2O_3$, and 12 parts of KOH or $KNO_3$. The second layer may consist of any of the anthraquinone contact masses described above.

The reaction is carried out by vaporizing crude anthracene into air in the proportion of 1:35 by weight and after heating up to 360°–380° C. in the automatic heat exchange elements the reaction gases are passed through the catalyst.

Figure 30:
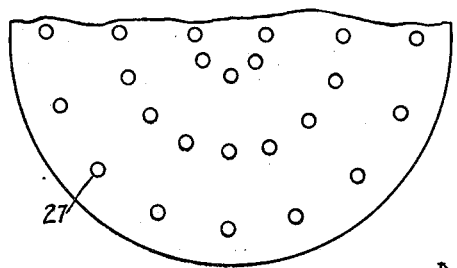
Figs. 29 and 30 are horizontal sections along the lines of 29—29—30—30 of Fig. 28.
Figure 29:
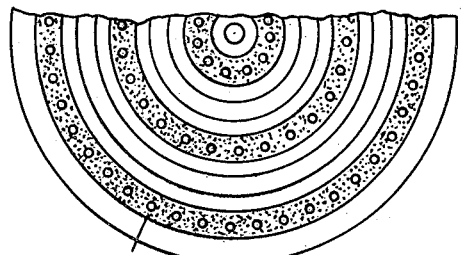
Figure 28:
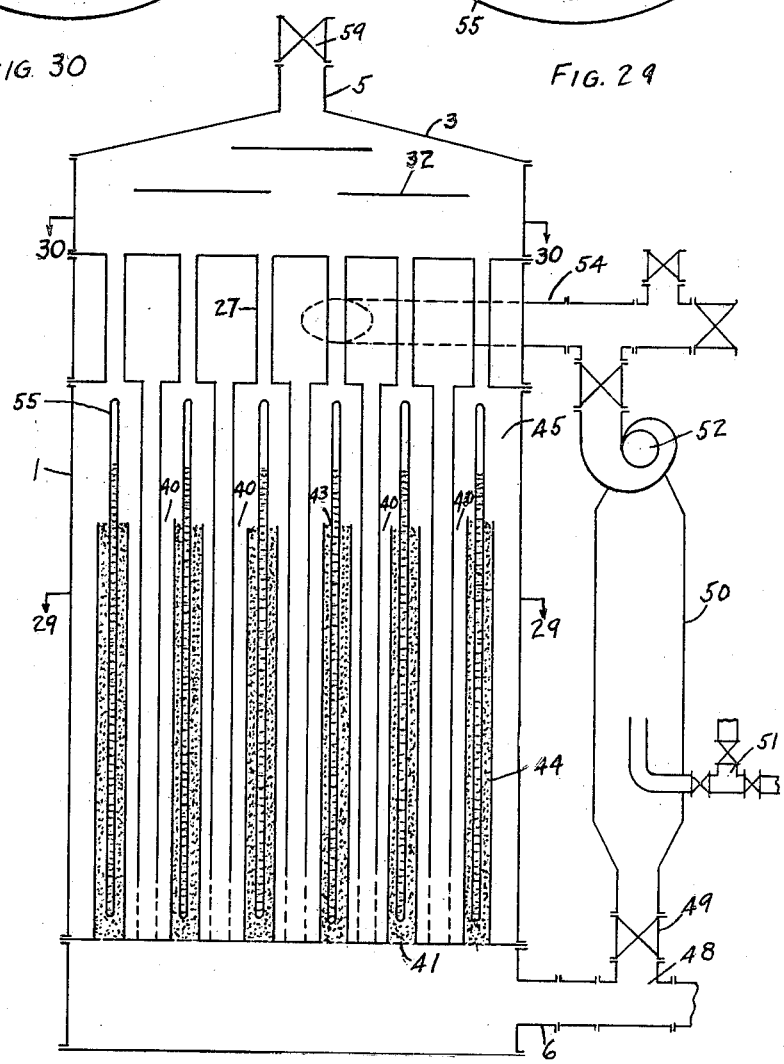
Fig. 28 is a section through a modified annular heat exchange converter provided with recirculating and heat equalizing means.

Figs. 25, 26 and 27 and Figs. 28, 29 and 30 illustrate respective converters which combine the features of recirculation and heat equalization with converters of the annular heat exchange element type which are shown in their simpler forms in Figs. 19 to 24. In Figs. 25 to 27 the recirculated gases pass through the heat exchange elements together with all of the reaction gases. In Figs. 28 to 30 the recirculated gases pass through the heat exchange elements but provision is made for the introduction of additional gases directly into the catalyst space through the pipes 27. The operation of the converter is, therefore, similar to that shown in Fig. 17 except for the difference in design of the heat exchange elements. For the sake of simplicity, the circulating elements and the elements of the converter bear the same numbers as in the foregoing figures. The operation of these converters is the same as described in Figs. 14 to 18 and the reactions which may be carried out in them are the same as those described above.

Fig. 31 shows a converter of the tubular automatic heat exchange element type with auxiliary gas introduction, heat equalizing means, and recirculation. The converter is very similar to that shown in Fig. 17 but instead of recirculating the gases through the heat exchange elements the pipe 54 from the pump 52 is carried to the pipe 25 and the recirculated gases are passed directly to the catalyst. Additional fresh gas is introduced through the pipe 77 which communicates with the branch pipe 78 to permit mixing of reaction gases. These fresh gases are introduced around the pipes 77 and passed through the heat exchangers. The operation of this converter is similar to that of Fig. 17 but it has the more important advantage that the recirculated reacted gases do not pass through the heat exchangers and are, therefore, not exposed to contact with the hot metal surfaces of the heat exchangers. As these latter are usually made of iron, aluminum, or other cheap metals which metals or their oxides are oxidation catalysts, it is desirable to prevent or reduce the contact of the reacted gases with the heat exchange elements, particularly where the reaction products are unstable in the presence of metals used in the heat exchange elements or their oxides. For reactions of this character, the converter shown in Fig. 31 is preferable to that shown in Fig. 17.

In the drawings the automatic heat exchange elements have been shown as round tubes or circular annuli. These shapes are the cheapest and simplest and for many reactions the most desirable. The particular shape of the elements forms, however, no part in the present invention and they may be of any suitable shape such as for example square, polygonal, or elliptical, or the like. In the case of tubular elements or the annuli they may be square, polygonal or elliptical. The choice of shape will be determined by the skilled engineer, taking into consideration cost, convenience and assembly. In some cases rectangular or hexagonal elements have some advantage as they can be placed very closely and therefore decrease the thickness of catalyst zones between them. These constructions are desirable in certain reactions where the exotherm is very high.

While it is an advantage of the present invention that the converters and heat exchange elements may be made of relatively cheap metals, such as iron, aluminum and the like, it should be understood that any other metals may be used which are either inert or catalytically active. In the case of some metals which exert a deleterious catalytic influence on the reaction, either in the elementary form or in the form of their oxides, it may be desirable to inactivate these metals by coating the surfaces contacting with the gases with various anti-catalytic substances, such as for example alkali or alkaline earth metal salts. A good example of substances which may be used are potassium phosphate, potassium sulfate or bisulfate, and the like.

As has been described in the more detailed portion of the description, the invention is applicable to purification reactions in which an undesired impurity has been burned out, such as for example, the purification of crude anthracene and phenanthrenes with total combustion to carbazole, crude naphthalene, crude mononuclear aromatic hydrocarbons, high sulfur gasolenes or mineral oils, ammonia from coal tar, and the like.

Throughout the claims the terms "catalyst layer" and "converter" will be used as equivalents, since it is customary in practice to consider each catalyst layer as a separate conversion stage, whether housed in a separate shell or not, and therefore as a separate unit of the apparatus.

This is a division of my pending application, Serial No. 234,660, filed November 21, 1927.

What is claimed as new is:

1. A method of purifying polynuclear hydrocarbons containing impurities more readily oxidized than they themselves which comprises passing them in vapor phase and admixed with air through a bed of catalyst in direct physical contact therewith, the temperature of the bed being maintained at the desired value for selective oxidation of the impurities by conducting such portion of at least one of the gaseous components of the mixture as the exotherm of the reaction may require into the bed in indirect heat exchange relation with catalyst, reversing the direction of flow of the gas at a point materially spaced from the surface of the catalyst and conducting it toward said surface in direct heat exchange relation but without physical contact with the catalyst, then releasing it adjacent to said surface of the catalyst to permit it to flow therethrough as specified, said surface of the catalyst thus being maintained comparatively hot while the body thereof is comparatively cool.

2. A method of purifying polynuclear hydrocarbons containing impurities more readily oxidized than they themselves which comprises passing them in vapor phase and admixed with air through a bed of catalyst in direct physical contact therewith, the temperature of the bed being maintained at the desired value for selective oxidation of the impurities by conducting such portion of at least one of the gaseous components of the mixture as the exotherm of the reaction may require into the bed in indirect heat exchange relation with catalyst, reversing the direction of flow of the gas at a point materially spaced from the surface of the catalyst and conducting it toward said surface in direct heat exchange relation but without physical contact with the catalyst, then releasing it adjacent to said surface of the catalyst to permit it to flow therethrough as specified, said surface of the catalyst thus being maintained comparatively hot while the body thereof is comparatively cool, the temperature of the face layer of the catalyst being maintained approximately between the limits of 370 and 440° C.

3. A method of purifying polynuclear hydrocarbons containing impurities more readily oxidized than they themselves which comprises passing them in vapor phase and admixed with air through a bed of catalyst in direct physical contact therewith, the temperature of the bed being maintained at the desired value for selective oxidation of the impurities by conducting such portion of at least one of the gaseous components of the mixture as the exotherm of the reaction may require into the bed in indirect heat exchange relation with catalyst, reversing the direction of flow of the gas at a point materially spaced from the surface of the catalyst and conducting it toward said surface in direct heat exchange relation but without physical contact with the catalyst, then releasing it adjacent to said surface of the catalyst to permit it to flow therethrough as specified, said surface of the catalyst thus being maintained comparatively hot while the body thereof is comparatively cool, the temperature of the face layer of the catalyst being maintained approximately between the limits of 370 and 440° C., the hydrocarbon employed being crude anthracene and an impurity to be removed being carbazol.

4. A method of purifying polynuclear hydrocarbons containing impurities more readily oxidized than they themselves which comprises passing them in vapor phase and admixed with air through a bed of catalyst in direct physical contact therewith, the temperature of the bed being maintained at the desired value for selective oxidation of the impurities by conducting such portion of at least one of the gaseous components of the mixture as the exotherm of the reaction may require into the bed in indirect heat exchange relation with catalyst, reversing the direction of flow of the gas at a point materially spaced from the surface of the catalyst and conducting it toward said surface in direct heat exchange relation but without physical contact with the catalyst, then releasing it adjacent to said surface of the catalyst to permit it to flow therethrough as specified, said surface of the catalyst thus being maintained comparatively hot while the body thereof is comparatively cool, the temperature of the face layer of the catalyst being maintained approximately between the limits of 370 and 440° C., the hydrocarbon employed being crude anthracene and an impurity to be removed being carbazol, the ratio of hydrocarbon to air being approximately between 1:35 and 1:40.

5. A method of purifying polynuclear hydrocarbons containing impurities more readily oxidized than they themselves which comprises passing them in vapor phase and admixed with air through a bed of catalyst in direct physical contact therewith, the temperature of the bed being maintained at the desired value for selective oxidation of the impurities by conducting such portion of at least one of the gaseous components of the mixture as the exotherm of the reaction may require into the bed in indirect heat exchange relation with catalyst, reversing the direction of flow of the gas at a point materially spaced from the surface of the catalyst and conducting it toward said surface in direct heat exchange relation but without physical contact with the catalyst, then releasing it adjacent to said surface of the catalyst to permit it to flow therethrough as specified, said surface of the catalyst thus being maintained comparatively hot while the body thereof is comparatively cool, the temperature of the face layer of the catalyst being maintained approximately between the limits of 370 and 440° C., the hydrocarbon employed being crude anthracene and an impurity to be removed being carbazol, the ratio of hydrocarbon to air being approximately between 1:35 and 1:40, the catalyst containing an anti-catalyst consisting of an alkali forming metal compound.

ALPHONS O. JAEGER.